United States Patent
Thomas

(10) Patent No.: US 11,328,724 B2
(45) Date of Patent: May 10, 2022

(54) EXECUTION OF WORKFLOW TASKS CORRESPONDING TO VOICE COMMANDS

(71) Applicant: Hewlett-Packard Development Company, L.P., Spring, TX (US)

(72) Inventor: Marcus Allen Thomas, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 2 days.

(21) Appl. No.: 16/975,240

(22) PCT Filed: Mar. 23, 2018

(86) PCT No.: PCT/US2018/024160
§ 371 (c)(1),
(2) Date: Aug. 24, 2020

(87) PCT Pub. No.: WO2019/182616
PCT Pub. Date: Sep. 26, 2019

(65) Prior Publication Data
US 2020/0402508 A1  Dec. 24, 2020

(51) Int. Cl.
*G10L 15/22* (2006.01)
*G06F 3/16* (2006.01)
*G10L 15/30* (2013.01)
*H04N 1/00* (2006.01)
*H04N 1/04* (2006.01)

(52) U.S. Cl.
CPC ............. *G10L 15/22* (2013.01); *G06F 3/167* (2013.01); *G10L 15/30* (2013.01); *H04N 1/00037* (2013.01); *H04N 1/00384* (2013.01); *H04N 1/00403* (2013.01); *H04N 1/04* (2013.01); *G10L 2015/223* (2013.01)

(58) Field of Classification Search
CPC ......... G10L 15/22; G10L 15/30; G06F 3/167; H04N 1/00037
See application file for complete search history.

(56) References Cited

U.S. PATENT DOCUMENTS

| | | | |
|---|---|---|---|
| 6,167,218 A | 12/2000 | Kanazawa et al. | |
| 6,580,838 B2 | 6/2003 | Oliver et al. | |
| 8,340,975 B1 | 12/2012 | Rosenberger | |
| 9,536,521 B2 | 1/2017 | Golding et al. | |
| 2006/0227946 A1 | 10/2006 | Henderson | |
| 2011/0223893 A1* | 9/2011 | Lau | H04M 3/42382 455/414.1 |
| 2012/0198339 A1 | 8/2012 | Williams | |
| 2013/0144629 A1 | 6/2013 | Johnston | |

(Continued)

*Primary Examiner* — Ibrahim Siddo
(74) *Attorney, Agent, or Firm* — Mannava & Kang, P.C.

(57) ABSTRACT

According to examples, an apparatus may include a processor and a memory on which are stored machine readable instructions that when executed by the processor cause the processor to access a voice command file pertaining to a data file and to send the voice command file to at least one of a server and a voice services provider, in which the voice services provider is to translate the voice command file to a workflow task message and to send the workflow task message to the server. The instructions may also cause the processor to receive the workflow task message from the server and execute a workflow task on the data file corresponding to the received workflow task message.

15 Claims, 5 Drawing Sheets

(56) References Cited

U.S. PATENT DOCUMENTS

| | | | |
|---|---|---|---|
| 2013/0329243 A1* | 12/2013 | Pettis | F16M 11/18 |
| | | | 358/1.13 |
| 2016/0224279 A1* | 8/2016 | Kim | H04L 67/10 |
| 2017/0329573 A1 | 11/2017 | Mixter | |
| 2018/0288248 A1* | 10/2018 | Shen | H04N 1/00403 |

* cited by examiner

SERVER
310

NON-TRANSITORY COMPUTER READABLE MEDIUM
500

RECEIVE A VOICE COMMAND FILE FROM A FORMING APPARATUS
502

ASSIGN A UNIQUE IDENTIFIER TO THE VOICE COMMAND FILE
504

OUTPUT THE VOICE COMMAND FILE TO A VOICE SERVICES PROVIDER
506

RECEIVE A WORKFLOW TASK MESSAGE FROM THE VOICE SERVICES PROVIDER
508

AT LEAST ONE OF OUTPUT THE WORKFLOW TASK TO THE FORMING APPARATUS OR EXECUTE THE WORKFLOW TASK
510

DETERMINE A TYPE OF THE FORMING APPARATUS
512

FORMAT THE WORKFLOW TASK MESSAGE TO THE DETERMINED TYPE OF THE FORMING APPARATUS
514

FIG. 5

EXECUTION OF WORKFLOW TASKS CORRESPONDING TO VOICE COMMANDS

BACKGROUND

Various types of forming apparatuses may be implemented to print media, such as inkjet printing devices or laser printing devices. Other types of forming apparatuses may be implemented to fabricate three-dimensional (3D) objects, such as 3D fabrication devices. The forming apparatuses may include user interfaces that enable users to control operations of the forming apparatuses through touch interactions on the user interfaces. The operations may include forming operations and in some instances, data file workflow operations, such as emailing data files or storing data files on a network storage location.

BRIEF DESCRIPTION OF THE DRAWINGS

Features of the present disclosure are illustrated by way of example and not limited in the following figure(s), in which like numerals indicate like elements, in which:

FIG. 5 shows a block diagram of an example server that may manage voice command files received from an apparatus.

DETAILED DESCRIPTION

Figure 1:
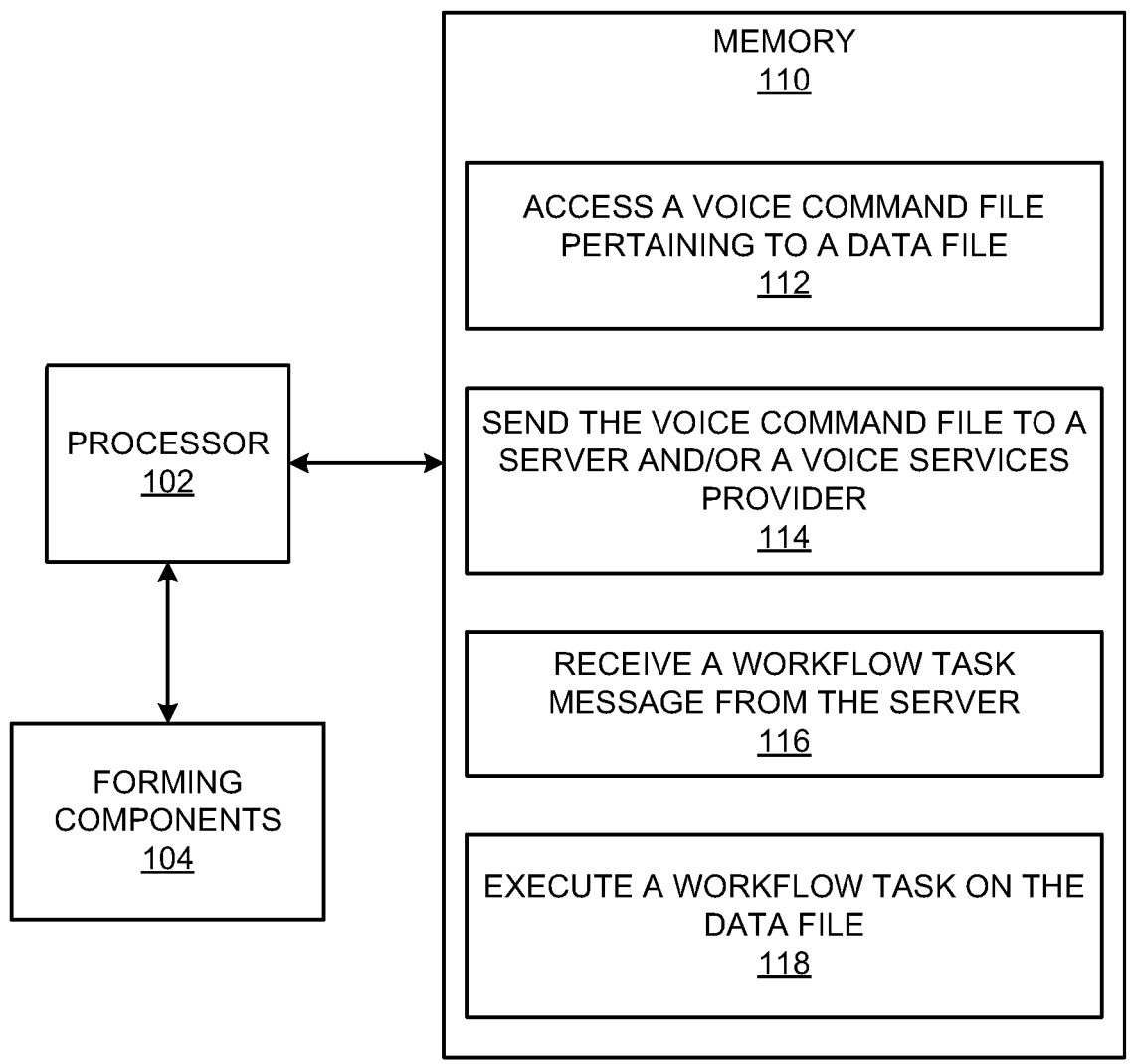
FIG. 1 shows a block diagram of an example apparatus that may execute a workflow task corresponding to a voice command.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses and methods for executing a workflow task corresponding to a voice command on a data file. The apparatuses may be forming apparatuses, e.g., printing devices, multifunction devices, 3D fabrication devices, or the like. In addition, the apparatuses may access a voice command file pertaining to a data file in which the voice command file may include a voice command to execute a particular workflow task on the data file. The workflow task may include a scanning task, a printing task, an emailing task, a data file storage task, and/or the like.

The apparatuses disclosed herein may not have hardware or software to translate or interpret the voice command file into the workflow task. In one regard, the apparatuses may be manufactured and/or programmed in a relatively simpler and more efficient manner as compared with apparatuses that are manufactured and/or programmed to have these capabilities. In addition, the apparatuses disclosed herein may leverage voice translation services that may be available from voice services providers. That is, the apparatuses disclosed herein may rely upon a voice services provider to translate the voice command file into the workflow task. However, instead of communicating directly with the voice services provider, the apparatuses may interact with a server of a cloud-based workflow managing service.

The server may manage the voice command files by tracking the voice command files, e.g., by assigning unique identifiers to the voice command files, managing supply of the voice command files to a voice services provider, managing receipt of workflow task messages from the voice services provider, sending the workflow task messages to the appropriate apparatuses, etc. In some examples, the server may format the workflow task messages differently for different types of apparatuses such that the server may provide workflow task management services to multiple types of apparatuses. The server may also be programmed to execute various workflow tasks, such as, storing data files at particular locations, emailing data files, assigning data files to workflow projects, or the like.

According to examples, the apparatuses disclosed herein may not automatically send voice command files as the apparatuses access the voice command files. Instead, the apparatuses may determine whether media is in a feed tray of the apparatus and if so, may send the voice command files to the server. However, if a media is not in the feed tray, the apparatuses may output a request for a user to place a media on the feed tray or identify which data file corresponds to the voice command in the voice command file. In one regard, by delaying output of the voice command files, the apparatuses may reduce or prevent the voice command file from unnecessarily being translated, which may reduce bandwidth consumption on a network as well as resource utilization at the server and the voice services provider.

FIG. 1 shows a block diagram of an example apparatus 100 that may execute a workflow task corresponding to a voice command. It should be understood that the example apparatus 100 depicted in FIG. 1 may include additional features and that some of the features described herein may be removed and/or modified without departing from the scope of the apparatus 100.

In some examples, the apparatus 100 may be a forming apparatus, such as a printing device, a multifunction device that includes scanning and printing capabilities, or the like. In other examples, the apparatus 100 may be a different type of forming apparatus, such as a 3D fabrication device that may fabricate 3D objects. In any regard, the apparatus 100 may be network enabled such that the apparatus 100 may communicate over a network, e.g., the Internet, an intranet, or the like.

As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 is depicted as including a single processor 102, it should be understood that the apparatus 100 may include multiple processors, multiple cores, or the like, without departing from a scope of the apparatus 100.

The apparatus 100 may also include forming components 104 that the processor 102 may control in printing documents and/or fabricating 3D objects. The forming components 104 may include components for printing and/or fabricating, such as, motors, encoders, ink delivery devices, heaters, 3D particle spreaders, and/or the like.

The apparatus 100 may further include a memory 110 that may have stored thereon machine readable instructions 112-118 (which may also be termed computer readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to access a voice command file pertaining to a data file. The voice command file may be an electronic file corresponding to a voice command that a user may have inputted via the user's voice into the apparatus 100. That is, the voice command file may be an electronically converted version of the voice command. According to examples, the apparatus 100 may have received the voice command directly from a user via a microphone on the apparatus 100. In these examples, the processor 102 or another component in the apparatus 100 may have converted the voice command into the voice command file. The data file may be an electronic file containing data. For instance, the data file may an electronic version of a scanned document or of an original electronic document. The data file may additionally or alternatively be accessed from a hardware source, e.g., a universal serial bus (USB) drive, a device memory, or the like, or from a cloud repository.

In other examples, the apparatus 100 may have received the voice command file from an electronic device that is external to the apparatus 100. The electronic device may be a smartphone, a laptop computer, a tablet computer, a voice-enabled device, or the like. In these examples, a user may have inputted a voice command into the electronic device and the electronic device may have converted the voice command into the voice command file. In addition, the electronic device may have communicated the voice command file to the apparatus 100 via a wireless or wired connection. By way of particular example, the electronic device may include an app that may receive voice commands, generate voice command files, and communicate the voice command files to the apparatus 100.

In any regard, the voice command file may pertain to a workflow task that the apparatus 100 is to perform on the data file. The workflow task may include, for instance, scanning a media, printing a media, sending a facsimile of the data file, printing a 3D object, storing the data file in a network or cloud-based storage location, emailing the data file to an email address, adding the data file to a workflow project, and/or the like. The voice command file may also pertain to multiple workflow tasks, e.g., both printing copies of a document and storing a copy of the data file on a cloud-based data storage location. The data file may be an electronic document, an electronic file, machine readable instructions for printing an image on a document or for forming a 3D object, or the like.

According to examples, the apparatus 100 may not include capabilities to translate the voice command file into machine readable instructions corresponding to execution of the workflow task. That is, for instance, the apparatus 100 may not include hardware, firmware, or software for translating or converting the voice command file into the machine readable instructions. In one regard, therefore, costs associated with fabricating and maintaining the apparatus 100 may be maintained at a relatively low level. Instead, the apparatus 100 may leverage voice command translation capabilities of a voice services provider, e.g., a cloud-based voice services provider. The apparatus 100 may use any of a number of cloud-based voice services providers to translate or convert the voice command file into a workflow task instruction.

The voice services provider may be a publicly accessible voice translation services provider that may translate the voice command file into the machine readable instructions. In some examples, the voice services provider may enable programming of various voice commands to correspond to the workflow tasks. Thus, the voice services provider may translate a voice command contained in a voice command file into a workflow task based on the programming.

The processor 102 may fetch, decode, and execute the machine-readable instructions 114 to send the voice command file to at least one of a server and a voice services provider. In the former event, the server may output the voice command file to the voice services provider. In either event, the voice services provider may translate the voice command file to a workflow task message and may send the workflow task message to the server. The server may be part of a cloud-based workflow managing service. The cloud-based workflow managing service may include the server along with multiple other servers to manage voice command files received from an apparatus 100 or from multiple apparatuses, in which the multiple apparatuses may be of the same type or of multiple types. The server may manage the voice command files by tracking the voice command files, e.g., by assigning unique identifiers to the voice command files, managing supply of the voice command files to a voice services provider, managing receipt of workflow task messages from the voice services provider, sending the workflow task messages to the appropriate apparatuses, etc. In some examples, the server may format the workflow task messages differently for different types of apparatuses.

The processor 102 may fetch, decode, and execute the machine-readable instructions 116 to receive a workflow task message from the server. As discussed herein, the voice services provider may have translated the voice command file into the workflow task message and may have sent the workflow task message to the server. In addition, the server may have sent the workflow task message to the processor 102. In some examples, the server may have sent the workflow task message in a current format, while in other examples, the server may have reformatted the workflow task message for the processor 102 prior to sending the workflow task message to the processor 102.

The processor 102 may fetch, decode, and execute the machine-readable instructions 118 to execute a workflow task corresponding to the received workflow task message. According to the examples, the processor 102 may decipher the workflow task message to identify the workflow task. For instance, the workflow task message may include machine-readable instructions pertaining to the workflow task and the processor 102 may determine the action that the processor 102 is to take on the data file based on the machine readable instructions pertaining to the workflow task. By way of particular example, the voice command file may be a command to store a data file in a cloud-based storage location. The workflow task message may indicate that the command is for the processor 102 to store the data file in the cloud-based storage location. The processor 102 may interpret or process the command and may upload the data file to the cloud-based storage location.

Instead of the memory 110, the apparatus 100 may include hardware logic blocks that may perform functions similar to the instructions 112-118. In other examples, the apparatus 100 may include a combination of instructions and hardware logic blocks to implement or execute functions corresponding to the instructions 112-118. In any of these examples, the processor 102 may implement the hardware logic blocks and/or execute the instructions 112-118. As discussed herein, the apparatus 100 may also include additional instructions and/or hardware logic blocks such that the processor 102 may execute operations in addition to or in place of those discussed above with respect to FIG. 1.

Figure 2:
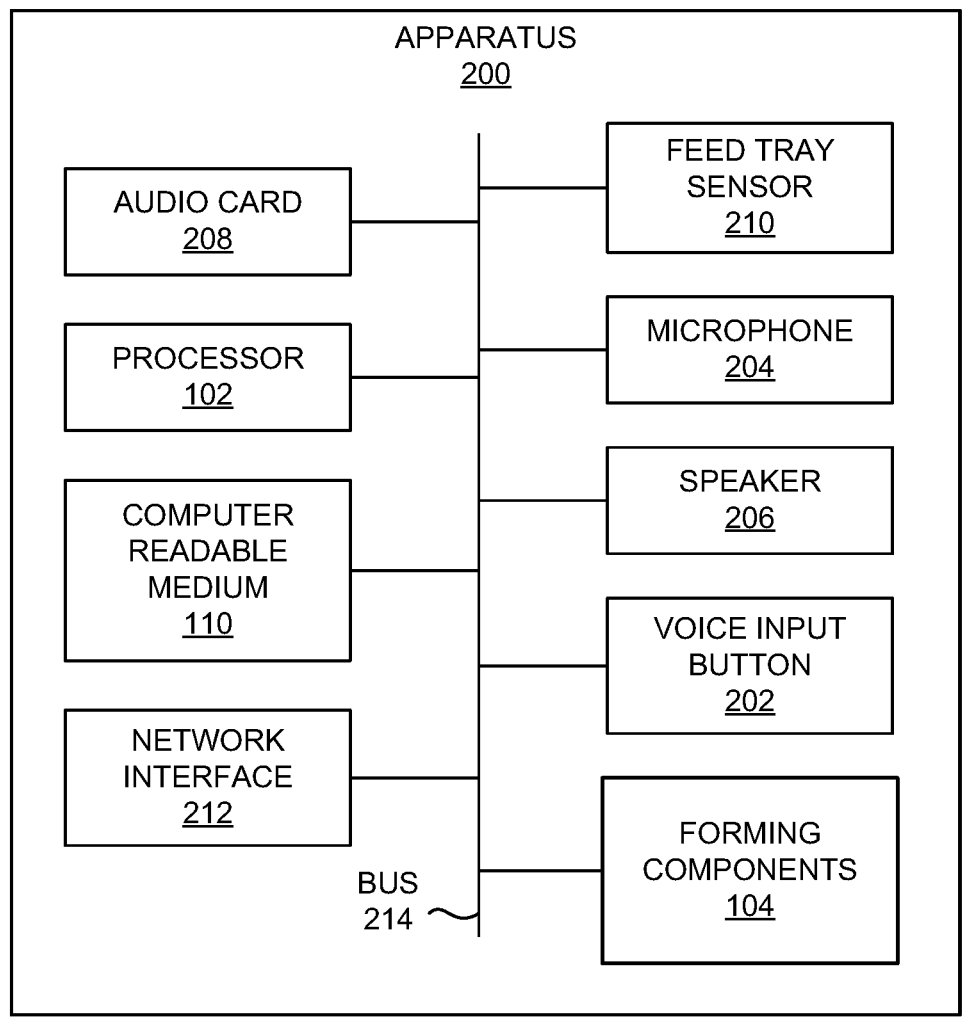
FIG. 2 shows block diagram of an example apparatus that may execute a workflow task corresponding to a voice command.

With reference now to FIG. 2, there is shown a block diagram of an example apparatus 200 that may execute a workflow task corresponding to a voice command. It should be understood that the example apparatus 200 depicted in FIG. 2 may include additional features and that some of the features described herein may be removed and/or modified without departing from the scope of the apparatus 200.

The apparatus 200 may be equivalent to or the same as the apparatus 100 depicted in FIG. 1. In this regard, the apparatus 200 may include the same or similar components as the apparatus 100. As shown, the apparatus 200 may include the processor 102, the forming components 104, and the memory 110. These components are not described in detail with respect to the apparatus 200 as they have already been described above in detail with respect to FIG. 1.

As shown, the apparatus 200 may include a voice input button 202 that a user may activate. The voice input button 202 may be a physical button on an exterior of the apparatus 200, an icon displayed on a graphical user interface of a display of the apparatus 200, or the like. According to the examples, activation of the voice input button 202 may cause the processor 102 to receive a voice input. In these examples, therefore, the processor 102 may not receive a voice input unless or until the voice input button 202 is activated. In other examples, the processor 102 may receive a voice input in response to a user saying a particular word or phrase.

In any regard, the apparatus 200 may include a microphone 204 through which the voice input may be received. The apparatus 200 may also include a speaker 206 through which the processor 102 may output audio. The apparatus 200 may further include an audio card 208 that may convert the voice input into a voice command file. In other examples, and as discussed above, the apparatus 200 may receive the voice command file from an externally located electronic device. In some examples, the microphone 204, the speaker 206, and/or the audio card 208 may be omitted from the apparatus 200.

The apparatus 200 may further include a feed tray sensor 210 that may detect whether media is in a feed tray of the apparatus 200. The feed tray sensor 210 may be an optical sensor, a mechanical sensor, or the like. According to examples, based on a voice command file being accessed, the processor 102 may determine from the feed tray sensor 210 whether the media is in the feed tray. That is, for instance, the processor 102 may delay sending of the voice command file to the server and/or the voice services provider based on a determination that a media is not in the feed tray. In addition, the processor 102 may output a request for a user to place a media on the feed tray, to identify a data file (e.g., stored on the apparatus 200 or at another location) upon which a workflow task is to be executed, or a combination thereof. The processor 102 may send the voice command file to the server and/or the voice services provider following a determination that the user has placed a media on the feed tray or has identified the data file to which the voice command pertains. In one regard, the processor 102 may delay sending of the voice command file such that the voice command file may be prevented from being sent unnecessarily, e.g., when there is no data file upon which a workflow task is to be executed.

As further shown in FIG. 2, the apparatus 200 may include a network interface 212 through which the processor 102 may communicate with a server. The network interface 212 may include hardware and/or instructions to enable the communications with the server. The apparatus 200 may further include a bus 214 through which the processor 102 may communicate with the components 104, 110, and 202-212 of the apparatus 200. Some of the components 104, 110, and 202-212 may also communicate with each other via the bus 214.

Figure 3:
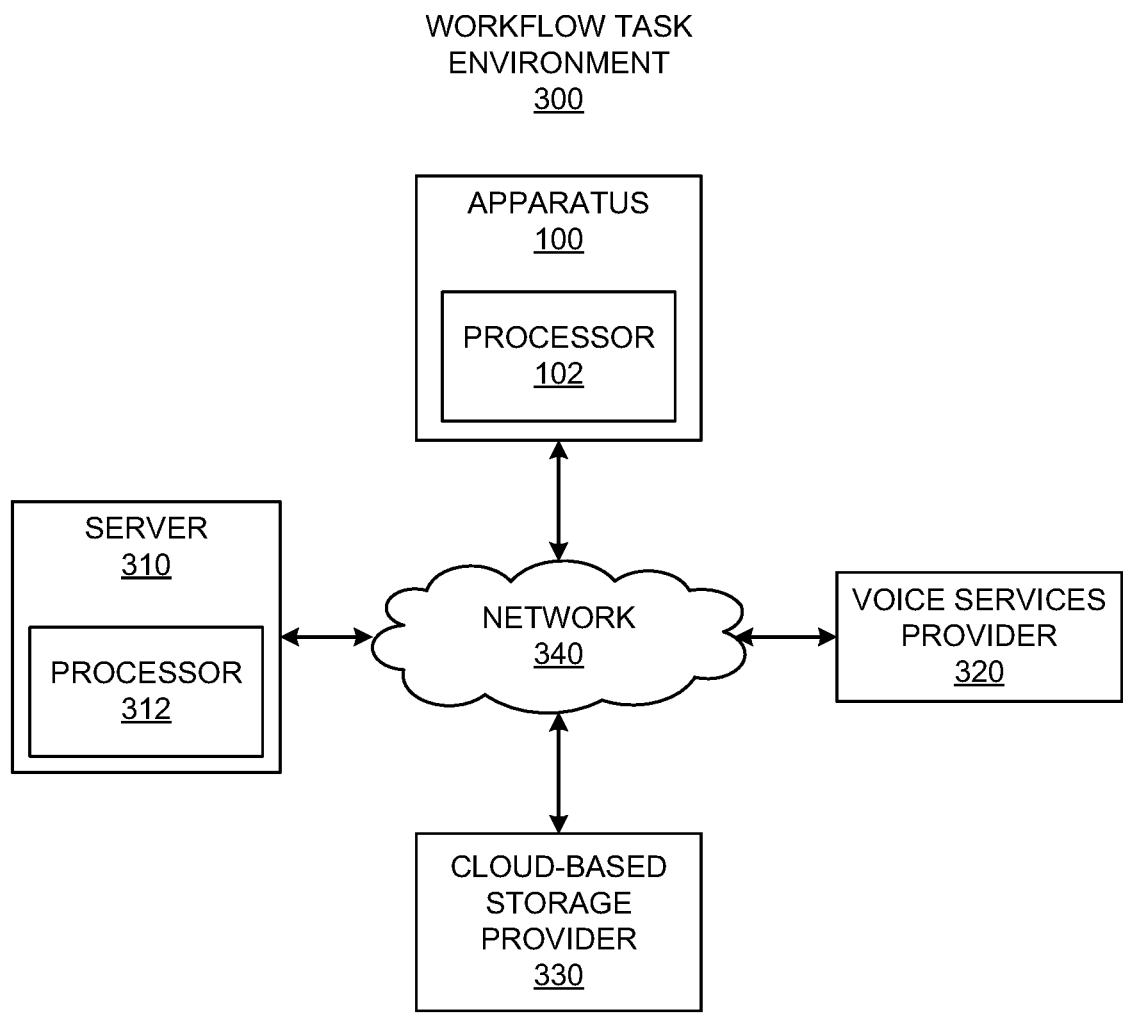
FIG. 3 shows a block diagram of an example workflow task environment that may include the apparatus depicted in FIG. 1.

Reference is now made to FIG. 3, which shows a block diagram of an example workflow task environment 300 that may include the apparatus 100 depicted in FIG. 1. It should be understood that the example workflow task environment 300 depicted in FIG. 3 may include additional features and that some of the features described herein may be removed and/or modified without departing from the scope of the workflow task environment 300.

In addition to the apparatus 100, the workflow task environment 300 may include a server 310, a voice services provider 320, a cloud-based storage provider 330, and a network 340. The apparatus 100, e.g., the processor 102, may send a voice command file to the server 310 via the network 340. The network 340 may be a communications network over which the processor 102 may communicate data, e.g., as packets of data. In this regard, the network 340 may be the Internet, an intranet, or the like. In addition, the server 310 may be part of a cloud-based workflow managing service, as discussed herein.

According to examples, the processor 102 may send the data file to the server 310 along with the voice command file. In other examples, the server 310 may retrieve the data file from a source other than the apparatus 100, such as a cloud repository. In any regard, the server 310, and more particularly, a processor 312 of the server 310, may assign a unique identifier to the voice command file (and in some examples, the data file). The unique identifier may be a combination of alphanumeric elements that may be unique to the voice command file. The server 310 may track the voice command file using the unique identifier. In addition, the server 310 may track an identification of the apparatus 100 from which the voice command file was received using the unique identifier. The processor 312 may be a semiconductor-based microprocessor, a central processing unit (CPU), an application specific integrated circuit (ASIC), a field-programmable gate array (FPGA), and/or other suitable hardware device.

The server 310 may output the voice command file to the voice services provider 320 via the network 340. The server 310 may also include the unique identifier with the voice command file outputted to the voice services provider 320. The voice services provider 320 may translate the voice command file into a workflow task message and may send the workflow task message to the server 310 via the network 340. The voice services provider 320 may return the unique identifier with the workflow task message such that the server 310 may identify the apparatus 100 to which the workflow task message corresponds.

The server 310 may analyze the workflow task message to identify, from the workflow task message, a workflow task that is to be performed on the data file. Depending on the workflow task message, the server 310 may execute the workflow task and/or may output the workflow task to the apparatus 100. For instance, in the event that the workflow task includes a task that the server 310 may execute, the server 310 may execute the workflow task. By way of example, the workflow task may include emailing a copy of the data file to an email address. In this example, the server 310 may send the email with a copy of the data file to the particular email address. As another example in which the workflow task may include storing a copy of the data file with the cloud-based storage provider 330, the server 310 may send the data file to the cloud-based storage provider 330 for storage of the data file.

However, in other examples, the server 310 may send the workflow task messages to the apparatus 100 without executing a workflow task. The server 310 may also send the workflow task messages to the apparatus 100 in instances in which the workflow task includes a task that the apparatus 100 is to execute, the server 310 may output the workflow task message to the apparatus 100. According to examples, the server 310 may format the workflow task message to be compatible with the apparatus 100 prior to outputting the workflow task message to the apparatus 100. In these examples, the server 310 may manage voice command files of multiple types of apparatuses and may format the workflow task messages to be respectively compatible with the multiple types of apparatuses.

The apparatus 100 may decipher the workflow task message to identify the workflow task that the apparatus 100 is to execute on the data file. In addition, the apparatus 100 may execute the workflow task on the data file. By way of example in which the workflow task message is an instruction to print 50 copies of the data file, the apparatus 100, e.g., the processor 102, may decipher that message into a set of commands to control the forming components 104 to print 50 copies of the data file. The apparatus 100 may also execute other types of workflow tasks such as, emailing, storing, etc.

Figure 4:
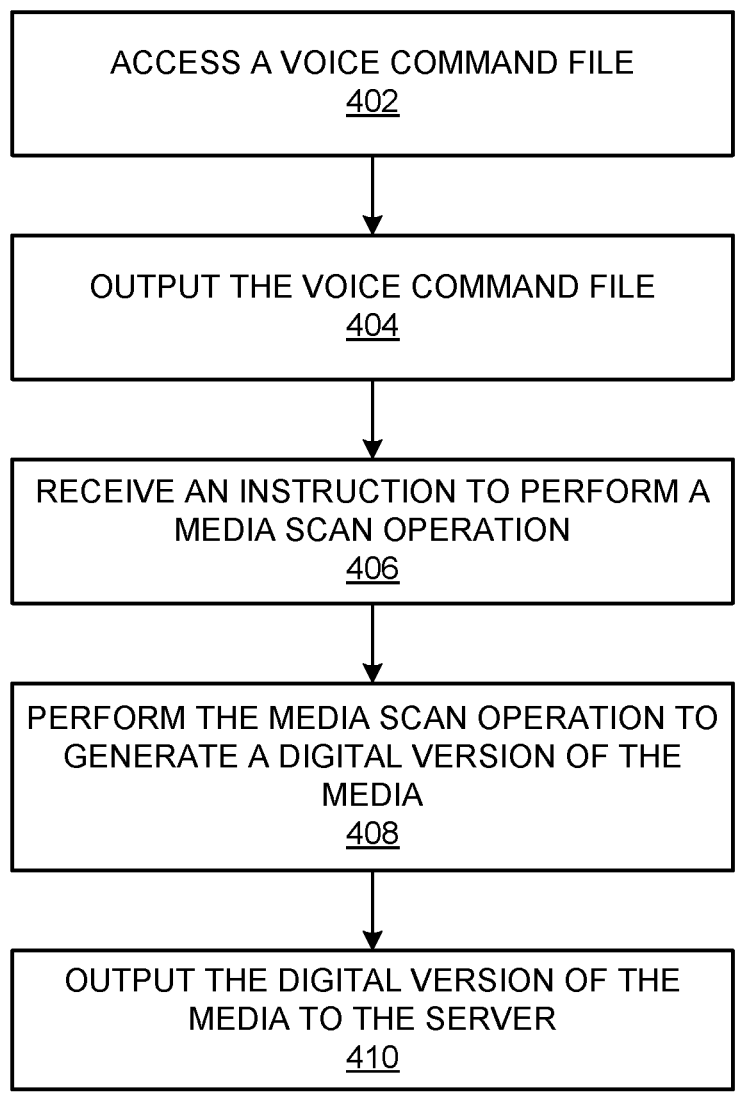
FIG. 4 show a flow diagram of an example method for executing a workflow task corresponding to a voice command on a data file.

Various manners in which the processor 102 of the apparatus 100 may operate are discussed in greater detail with respect to the method 400 depicted in FIG. 4. Particularly, FIG. 4 depicts a flow diagram of an example method 400 for executing a workflow task corresponding to a voice command on a data file. It should be understood that the method 400 depicted in FIG. 4 may include additional operations and that some of the operations described therein may be removed and/or modified without departing from the scope of the method 400. The description of the method 400 is made with reference to the features depicted in FIGS. 1-3 for purposes of illustration.

At block 402, the processor 102 may access a voice command file pertaining to a data file. As discussed herein, the processor 102 may access the voice command file by receiving a voice input through a microphone 204 and by converting the voice input by an audio card 208 of the apparatus 200. Alternatively, the processor 102 may access the voice command file by receiving the voice command file from an external electronic device.

At block 404, the processor 102 may output the voice command file to at least one of a server 310 and a voice services provider 320. According to examples, the processor 102 may output the voice command file to the server 310 and the server 310 may output the voice command file to the voice services provider 320. The voice services provider 320 may translate the voice command file to a workflow task message and may send the workflow task message to the server 310. In other examples, the server 310 or the voice services provider 320 may receive a voice command file from another apparatus, software application, cloud application, or the like.

At block 406, the processor 102 may receive an instruction to perform a media scan operation. For instance, the voice services provider 320 may send an instruction to the server that may include the account/printer and a translated workflow task message to the server 310. In response, the server 310 may send the instruction to perform the media scan operation to the processor 102. In addition, at block 408, the processor 102 may perform the media scan operation to generate a digital version of the media. Moreover, at block 410, the processor 102 may output the digital version of the media to the server 310. In some examples, the server 310 may also execute a workflow task on the data file according to the workflow task message.

In some examples, the processor 102 may access the voice command file at block 402 from an electronic device. In these examples, the electronic device may receive the instruction to perform the media scan operation from the server 310 and the electronic device may send the instruction to perform the media scan operation to the processor 102. In addition, as discussed herein, the processor 102 may determine whether a media is in a feed tray of a printing apparatus. Based on a determination that a media is not in the feed tray, the processor 102 may output a request for a user to place a media on the feed tray, output a request for a user to identify a data file upon which a workflow task is to be executed, or a combination thereof. In addition, the processor 102 may delay sending of the voice command file at block 404 until a determination is made that a media is in the feed tray, that an identification of the data file is received, or a combination thereof.

Some or all of the operations set forth in the method 400 may be contained as utilities, programs, or subprograms, in any desired computer accessible medium. In addition, the method 400 may be embodied by computer programs, which may exist in a variety of forms. For example, the method 400 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 5, there is shown a block diagram of an example server 310 that may manage voice command files received from an apparatus 100, 200. It should be understood that the example server 310 depicted in FIG. 5 may include additional features and that some of the features described herein may be removed and/or modified without departing from the scope of the server 310. The server 310 may be equivalent to or the same as the server 310 depicted in FIG. 3 and discussed above.

The server 310 may include a non-transitory computer readable medium 500 that may have stored thereon machine readable instructions 502-514 (which may also be termed computer readable instructions) that a processor 312 of the server 310 (or multiple processors of the server 310) may execute. The non-transitory computer readable medium 500 may be an electronic, magnetic, optical, or other physical storage device that contains or stores executable instructions. The non-transitory computer readable medium 500 may be, for example, Random Access memory (RAM), an Electrically Erasable Programmable Read-Only Memory (EEPROM), a storage device, an optical disc, and the like. The term "non-transitory" does not encompass transitory propagating signals.

The instructions 502 may cause a processor 312 of the server 310 to receive a voice command file pertaining to a workflow task for a data file from a forming apparatus 100, 200. As discussed herein, the processor 312 may receive the voice command file via a network 340. In addition, the processor 312 may receive multiple voice command files from other apparatuses via the network 340.

The instructions 504 may cause the processor 312 to assign a unique identifier to the voice command file. The unique identifier may be a unique combination of alphanumeric values assigned to the voice command file. The processor 312 may also assign the unique identifier to the data file corresponding to the voice command file.

The instructions 506 may cause the processor 312 to output the voice command file to a voice services provider 320, for instance, via the network 340. The processor 312 may also execute the instructions 508 to receive a workflow task message corresponding to the voice command file from the voice services provider 320, for instance, via the network 340.

The instructions 510 may cause the processor 312 to at least one of output the workflow task message to the forming apparatus 100, 200, such that the forming apparatus 100, 200 may execute the workflow task, and execute the workflow task. The processor 312 may execute the workflow task in instances in which the processor 312 is able to execute the workflow task. In other examples, the processor 312 may output the workflow task messages to the forming apparatus 100, 200 without executing workflow tasks identified in the workflow task messages.

The instructions 512 may cause the processor 312 to determine a type of the forming apparatus 100, 200. For instance, the processor 312 may determine a manufacturer, a model, a printing type, or the like, of the forming apparatus 100, 200. In addition, the instructions 514 may cause the processor 312 to format the workflow task message to the determined type of the forming apparatus 100, 200. Thus, for instance, the processor 312 may format the workflow task message into a particular syntax, programming language, and/or consistent with a particular printer driver model that the forming apparatus 100, 200 may understand.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a feed tray to receive media;
   a sensor to detect whether the media is in the feed tray;
   a processor; and
   a memory on which is stored machine readable instructions that, when executed by the processor, cause the processor to:
      access a voice command file pertaining to a data file;
      based on the voice command file being accessed, determine from the sensor whether a media is in the feed tray;
      based on a determination that a media is not in the feed tray, output a request for a media to be placed in the feed tray;
      send the voice command file to a voice services provider, wherein the voice services provider is to translate the voice command file to a workflow task message;
      receive the workflow task message from the voice services provider; and
      execute a workflow task on the data file corresponding to the received workflow task message.

2. The apparatus of claim 1, further comprising:
   a microphone to receive a voice command;
   an audio card to convert the received voice command into the voice command file; and
   a network interface to send the voice command file over a network to the voice services provider.

3. The apparatus of claim 2, further comprising:
   a voice input button, wherein the instructions are further executable to cause the processor to receive the voice command in response to an activation of the voice input button.

4. The apparatus of claim 1, wherein, to access the voice command file, the instructions are further executable to cause the processor to:
   receive the voice command file from an electronic device, the electronic device being external to the apparatus.

5. The apparatus of claim 1, wherein to execute the workflow task, the instructions are further executable to cause the processor to decipher the received workflow task message into the workflow task.

6. The apparatus of claim 1, wherein the instructions are further executable to cause the processor to:
   based on the determination that a media is not in the feed tray, output a request to identify the data file upon which the workflow task is to be executed.

7. The apparatus of claim 6, wherein the instructions are further executable to cause the processor to:
   delay sending of the voice command file until the sensor detects a media in the feed tray, an identification of the data file is received, or a combination thereof.

8. The apparatus of claim 1, wherein the workflow task comprises a forming task, a data file scanning task, a data file storage task, a data file emailing task, a data file faxing task, a data file workflow incorporation task, or a combination thereof.

9. A method comprising:
   accessing, by a processor, a voice command file pertaining to a data file;
   responsive to the voice command file being accessed, determining, by the processor, whether a media is in a feed tray of a printing apparatus;
   based on a determination that a media is not in the feed tray, outputting a request for a media to be placed in the feed tray;

transmitting, by the processor, the voice command file to a voice services provider, wherein the voice services provider is to translate the voice command file to a workflow task message;
receiving, by the processor, the workflow task message from the voice services provider; and
executing, by the processor, a workflow task on the data file corresponding to the workflow task message.

10. The method of claim 9, further comprising:
detecting an activation of a voice input button;
receiving a voice command based on the detected activation of the voice input button; and
converting the received voice command into the voice command file.

11. The method of claim 9, wherein accessing the voice command file further comprises accessing the voice command file at an electronic device, wherein the method further comprises:
receiving an instruction to perform a media scan operation from a server; and
sending, by the electronic device, the instruction to perform the media scan operation to the processor.

12. The method of claim 9, further comprising:
based on the determination that a media is not in the feed tray, outputting a request to identify the data file upon which the workflow task is to be executed; and
delaying sending of the voice command file until a determination is made that a media is in the feed tray, that an identification of the data file is received, or a combination thereof.

13. A non-transitory computer readable medium on which is stored machine readable instructions that when executed by a processor, cause the processor to:
receive a voice command file pertaining to a workflow task for a data file from a forming apparatus;
based on the voice command file being received, determine from a sensor whether a media is in a feed tray of the forming apparatus;
based on a determination that a media is not in the feed tray, output a request for a media to be placed in the feed tray;
transmit the voice command file to a voice services provider, wherein the voice services provider is to translate the voice command file to a workflow task message;
receive the workflow task message corresponding to the voice command file from the voice services provider;
at least one of:
output the workflow task message to the forming apparatus, wherein the forming apparatus is to execute the workflow task on the data file corresponding to the received workflow task message; and
execute the workflow task on the data file corresponding to the received workflow task message.

14. The non-transitory computer readable medium of claim 13, wherein the instructions are further executable to cause the processor to:
assign a unique identifier to the voice command file; and
transmit the unique identifier with the voice command file to the voice services provider.

15. The non-transitory computer readable medium of claim 13, wherein the instructions are further executable to cause the processor to;
determine a type of the forming apparatus;
format the received workflow task message to the determined type of the forming apparatus; and
transmit the formatted workflow task message to the forming apparatus.

* * * * *